United States Patent [19]

Bhattacharyya et al.

[11] 4,417,992

[45] Nov. 29, 1983

[54] DUST CONTROL

[75] Inventors: Bhupati R. Bhattacharyya, Downers Grove; William J. Roe, Aurora, both of Ill.

[73] Assignee: Nalco Chemical Company, Oak Brook, Ill.

[21] Appl. No.: 449,434

[22] Filed: Dec. 13, 1982

Related U.S. Application Data

[63] Continuation-in-part of Ser. No. 288,665, Jul. 30, 1981.

[51] Int. Cl.$^3$ .............................................. C09K 11/02
[52] U.S. Cl. ................................. 252/88; 252/174.23; 252/174.24; 252/DIG. 2; 526/307.5; 526/307.2; 404/76; 299/12; 523/223; 524/555; 260/29.6
[58] Field of Search .................. 252/88, DIG. 2, 541, 252/544, 173, 174.24, 174.23, 382; 404/76; 299/12; 526/307.5, 307.2; 523/223; 524/555; 260/29.6

[56] References Cited

U.S. PATENT DOCUMENTS

| Re. 28,576 | 10/1975 | Anderson et al. | 260/29.6 H |
|---|---|---|---|
| 3,900,611 | 8/1975 | Corbett et al. | 427/214 |
| 4,074,039 | 2/1978 | Lim et al. | 526/307.2 |

FOREIGN PATENT DOCUMENTS

| 1066445 | 11/1979 | Canada . |
| 1114697 | 5/1968 | United Kingdom . |

OTHER PUBLICATIONS

Chemical Abtract (4), vol. 86, 1977, 17978y, Composition Containing Water and Polyacrylamide for Wetting-Dust, Ohraztroo et al.
Chemical Abstract (5) vol. 89, 1978, 76011n, Study of the Stability of Foam from a Foaming Agent Based on the Wetting Agent DB and Polyacrylamide, Rominkii et al.
Mitsuwa Kenkyujo KK, Control of Dust Formation after Dynamite Explosion, 21.01.74–JA–008478 (20.08.75), Derwent Publication LT040421.
Chemical Abtract (a), vol. 78, 1973, 73937f, Modification of Polyarylamide of Flocculation Purposes, Tobiczyk et al.
Chemical Abstract (2), vol. 79, 1973, 80648 m, Use of Foaming Agent Based on the Wetting Agent DB and Hydrolyzed Polacrylamide as a Foaming Dust Suppressor.
Chemical Abstract (3), vol. 89, 1978, 64157 b, Use of High–Molecular–Weight Surfactants for the Wetting and Setting of Finely Divided Coal Dust Kalmykov et al.

Primary Examiner—John E. Kittle
Assistant Examiner—Hoa Van Le
Attorney, Agent, or Firm—Richard L. Johnston

[57] ABSTRACT

Dust is controlled on roads, in mines, on mineral and tailings piles, surfaces of pulverized coal and mineral piles contained within open transit cars such as coal cars or trucks, and other surfaces containing coal particles, rock dust, clay, soil particles and other finely divided particles subject to dusting by applying thereto a dust inhibiting amount of a liquid dispersion of watery consistency of highly branched water swellable polymer of acrylamide or an acrylamide-acrylic acid copolymer, branched and/or cross-linked with a multifunctional unsaturated monomer containing more than one ethylenically unsaturated group, said cross-linked polyer or copolymer having a three-dimensional structure and being in the form of microgelatinous particles having a particle size not exceeding approximately one micron in an oil containing emulsion form, and having the properties of swelling dramatically in water and binding dust particles upon adsorption from solution.

14 Claims, No Drawings

DUST CONTROL

RELATED CASE

This application is a continuation-in-part of U.S. Pat. application Ser. No. 288,665, filed July 30, 1981.

BACKGROUND

Dusting is a common problem on roads, in underground mines such as coal mines and other types of underground mines, on mineral storage piles and tailings impoundments, and in various other areas where coal particles, rock dust (limestone), clay, slate, soil (earth), and other finely divided particles are present on various types of surfaces. Dusting is also a problem in transit when pulverized minerals and/or coals are shipped across country in coal cars or trucks. Such dusting causes material losses by wind erosion during transit. The usual method for allaying dust is to apply a water spray which is applied from a water truck equipped with either a pressurized spray system or a gravity fed distribution box. Such water trucks are commonly used, for example, on mine haulage roads, quarry access and haulage roads, and other types of dusty areas supporting traffic. The main problem with using water sprays is that the dust is controlled for only a short period of time depending on climate conditions, and the application of the spray has to be repeated frequently. The control of the dust is often poor. Incorporation of hygroscopic salts (i.e., calcium or magnesium chloride) in the water sprays is often done in an attempt to retain moisture on the dusty surface, but the method is often disadvantageous due to high salt usage rates.

Oil-type sprays have also been used either directly or as asphalt or oil emulsions, but these suffer from the disadvantage that they frequently adhere to vehicle tires and other objects which come into contact with them after the application has been made, and that required dosages are quite high. In some instances, this type of application also causes environmental and health concerns.

It is believed that in isolated cases encrusting agents such as polyvinyl acetate, styrene butadiene resin emulsions, and the like, have either been tested or used.

An object of the invention is to provide a new and improved method and compositions for controlling dusting conditions of the type previously described.

BRIEF SUMMARY OF THE INVENTION

In accordance with the invention a method and compositions are provided for controlling dust on roads, in mines, on mineral and tailings piles, controlling dust and wind erosion from surfaces of pulverized coal and mineral piles contained within open transit cars such as coal cars or trucks, and on other surfaces containing coal particles, rock dust, clay, soil particles and other finely divided particles subject to dusting, which comprises applying thereto a dust inhibiting amount of a liquid dispersion of watery consistency of a branched or cross-linked water swellable homo- or copolymer of non-ionic, anionic and cationic water soluble monomer, branched or cross-linked with a multifunctional monomer containing more than one ethylenically unsaturated group, said cross-linked polymer or copolymer having a three-dimensional structure and being in the form of microgelatinous particles having an average particle size not exceeding approximately one micron in an oil continuous emulsion form, and having the property of swelling dramatically in water and binding dust particles upon adsorption from solution.

DETAILED DESCRIPTION OF THE INVENTION

In order to evaluate the invention, a series of tests was made to facilitate laboratory activity screening of potential road dust control agents. The test was objective in that every attempt was made to quantify the observed results by adhering as strictly as possible to the following procedures.

Simulated road surface samples were prepared individually for each test, by evenly spreading 800 g of dry soil in a 6"×8"×1" aluminum pan. The soil was sprayed with 125 g of tap water and tightly packed to form a hard, smooth surface. The packed soil was then sprinkled evenly with 40 g of either dry, dusty clay (as obtained from a dusty road surface in Northern Illinois), or ground rock dust (limestone), and packed again. The sample was heated in an oven at 105° C. overnight, and upon cooling, sprinkled with an additional 40 g of loose dust.

Spraying the simulated road samples with predetermined volumes of product solutions was accomplished by uniformly moving the prepared pans under a stationary spray nozzle. A motorized winch assembly insured even application of the solutions. The treated samples were allowed to dry at about 50° C. (120° F.) for about 48 hours prior to wear resistance testing.

It was necessary to determine the effects of tire wear on the treated surfaces. This was accomplished by rolling a weighted tire assembly (8" diameter rubber tires on a weighted axle at about 30 pounds) over the dry samples a total of 30 times in each direction (lengthwise). In all cases, the condition of the surface before and after subjection to tire wear was observed.

The degree of dustiness (dust generated by tire wear) was estimated in a specially designed chamber. The apparatus consisted of an enclosure that was fitted with an overhead air nozzle, which when applied, would circulate the fine, loose dust at the sample surface throughout the chamber. The degree of dustiness was measured with a dust monitor (placed in the chamber), which collected an air sample during the circulation period, retained airborne dust on an impaction disc, and reported a dust "concentration" by measurement of beta radiation blockage by the collected dust. This procedure permitted a comparison of the activities of different compounds as dust control agents on the simulated road surfaces. A dust coefficient was calculated for each separate test by determining the upper dust concentration limit afforded by the monitor (complete beta radiation blockage), and applying the following calculation:

$$\text{RATING} = 100 - \left( \frac{\text{Measured Concentration}}{\text{Upper Detection Limit}} \times 100 \right)$$

Using the foregoing screening procedure a large number of compositions was tested and rated for dustiness on a rating scale of 1-100, the following rating criteria being used:

100–90: very little or no airborne dust
89–75: very low dustiness
74–50: moderate to high dustiness
49–30 high dustiness, poor dust control less than 30: extremely dusty—very little, if any, control Using this system, it was determined that effective dust control could be obtained by applying an aqueous solution of watery consistency of a highly branched water swellable homo- or copolymer of nonionic, anionic and cationic water soluble monomer, branched or cross-linked with multifunctional monomer containing more than one ethylenically unsaturated group, by controlling the proportions of the reactants so as to produce a cross-linked polymer or copolymer having a three-dimensional structure and in the form of microgelatinous particles having an average particle size not exceeding one micron in an oil continuous emulsion form and having the property of swelling in water.

Water soluble non-ionic monomers practiced in this invention are acrylamide, N-substituted derivatives of acrylamide, hydroxyalkyl acrylates, hydroxyalkyl methacrylates, etc. Anionic monomers practiced in this invention are the salt of acrylic acid, methacrylic acid, ethacrylic acid, α-chloroacrylic acid, crotonic acid, itaconic acid, maleic acid, fumaric acid, vinyl sulfonic acid and 2-acrylamido-2-methyl propane sulfonic acid, etc. The cationic monomers are quaternary salts of dialkyl amino ethyl methacrylate, diallyl dimethyl ammonium chloride, vinyl benzyl-trimethyl ammonium chloride and the like.

In a preferred embodiment of this invention the nonionic monomers are acrylamide, N-N-dimethylacrylamide and 2-hydroxyethyl methacrylate, but the most preferred one is acrylamide. The preferred monomers in the anionic monomer are the sodium salt of acrylic acid, methacrylic acid and 2-acrylamido-2-methyl propane sulfonic acid and the most preferred one is the sodium salt of acrylic acid. The preferred monomer in the cationic monomer is diallyl dimethyl ammonium chloride.

The water swellable cross-linked polymers of this invention were synthesized with compounds having two ethylenic groups copolymerizable with water soluble monomers. Exemplary cross-linkers include N-N'-methylene-bis-acrylamide, N,N'-methylene-bis-methacrylamide, other lower alkylidene-bis-acrylamides, divinyl benzene sulfonate, ethylene glycol diacrylate, ethylene glycol dimethacrylate, diallyl ethylene glycol ether, divinyl ester of polyethylene glycol (e.g., polyethylene glycol-600 diacrylate), divinyl ether of polyethylene glycol and the like difunctional monomers containing two $CH_2=C<$ groupings which are to some extent soluble in the aqueous phase. One of the water soluble brancher or cross-linking agents of this invention is an adduct of glycerine and allyl glycidyl ether referred to herein as "B-brancher". Other types of branchers are the adducts of allylamine and a copolymer of maleic anhydride and methyl vinyl ether with different mole ratios of allylamine to anhydrides, referred to herein as "A-branchers".

The quantity of cross-linking agent used in preparing these dust control agents appears to be critical. In some instances, large amounts of the cross-linking or branching agent are required and in other cases the best results have been obtained by using minimal amounts of the cross-linking or branching agent. It will be understood, therefore, that in some cases it is necessary to prepare a series of compositions in order to obtain those having the optimum dust control effect.

The following examples, in which the quantities are given by weight unless otherwise indicated, illustrate the best made contemplated for the preparation of the dust control composition and their application. In the examples, the general procedure of preparing the polymers by first preparing them in a water-in-oil emulsion and then inverting the emulsion to an oil-in-water emulsion with the water swellable polymers in the aqueous phase is analogous to procedures heretofore used in preparing water soluble polymers as illustrated by U.S. Pat. Nos. 3,624,019 (Re. 28,474) and 3,734,873 (Re. 28,576), as well as other patents well known in the art in which a water-in-oil emulsion is inverted to an oil-in-water emulsion of the polymers.

EXAMPLE I

The dust inhibiting composition was prepared in the form of a highly branched water swellable polymer of acrylamide and methylene-bis-acrylamide, the reaction product consisting of the following:

| Component | % By Weight |
|---|---|
| Copolymer ( 99.99 + % acrylamide / 60 ppm methylene-bis-acrylamide ) | 29.510 |
| Ethylene diamine tetraacetic acid (tetra sodium salt) | 0.006 |
| Boric Acid | 0.295 |
| Water | 41.234 |
| Light paraffinic solvent | 24.403 |
| Sorbitan monooleate | 1.968 |
| Substituted oxazoline | 0.984 |
| Nonylphenol ethoxylate | 1.600 |

EXAMPLE II

In this example the following composition resulted in a highly branched water swellable copolymer of acrylamide and acrylic acid cross-linked with a multifunctional unsaturated monomer containing more than one ethylenically unsaturated group and referred to herein for convenience as "A-brancher".

| Component | % by Weight |
|---|---|
| Terpolymer ( 70% acrylamide / 29% sodium acrylate / 1% "A" brancher ) | 28.408 |
| Ethylene diamine tetraacetic acid (tetra sodium salt) | 0.006 |
| Water | 44.786 |
| Light paraffinic solvent | 23.291 |
| Sorbitan monooleate | 1.909 |
| Nonylphenol ethoxylate | 1.600 |

"A" brancher is the reaction product of Gantrez 139 resin (which is a copolymer of maleic anhydride and methyl vinyl ether) with allylamine. Residual allylamine levels were extremely low (less than 2 ppm).

The synthesis of A-brancher involves the use of the following raw materials:

| | Weight Percent |
|---|---|
| Gantrez-139 (GAF) | 11.27 |
| Allylamine | 2.08 |
| LOPS (mineral oil) | 86.65 |

The procedure involved the gradual addition of allyl amine (approximately 0.5 hours) to a slurry of the Gantrez-139 in LOPS at a maximum temperature of 30° C. The addition was exothermic. After the addition was completed, the temperature was raised to 60°-65° C. and stirring was continued for an additional 4 hours at that temperature. At the end of this period, the reaction mixture was brought to room temperature, the product filtered, washed with small portion of toluene and dried in the vacuum oven at 35° C. over night.

The dry powder showed the following structure by IR and NMR.

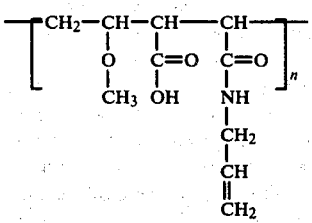

This composition in Example II which was in the form of a water-in-oil emulsion, was then diluted with more water to convert it to an oil-in-water emulsion, preferably one containing less than 0.5% of the water swellable cross-linked copolymer. The diluted solution which was essentially a liquid dispersion of watery consistency is applied at varying dosages, depending on the nature of the substrate but a common usage rate is 0.2–0.5 gallons of 0.4% solution per square yard of the surface being treated.

EXAMPLE III

The procedure was similar to that in Example II, consisting of the following:

| Component | | Weight Percent |
|---|---|---|
| Polymer | 70% acrylamide<br>28% sodium acrylate<br>2% 2-hydroxyethyl methacrylate<br>1% "A" brancher, based on total monomers | 28.620 |
| Ethylene diamine tetraacetic acid (tetra sodium salt) | | 0.006 |
| Water | | 44.407 |
| Light paraffinic solvent | | 23.478 |
| Sorbitan monooleate | | 1.889 |
| Nonylphenol ethoxylate | | 1.600 |

This product was also found to have excellent dust control properties.

EXAMPLE IV

A highly branched water swellable copolymer of acrylamide and acrylic acid was prepared by the general procedure described in Example II using a weight ratio of 70% acrylamide to 30% acrylic acid and 2.5%, based on the weight of the monomers, of a brancher referred to herein as "B-brancher" which was tris-(2-hydroxy-3-allyloxy) propoxy glycerol ether ($C_{21}H_{38}O_9$) and 4% emulsifier, homogenized prior to polymerization.

This product was also found to have excellent dust control properties.

The synthesis of B-brancher involves the use of the following raw materials:

| | Weight % | Moles |
|---|---|---|
| Glycerol (anhydrous) | 30.67 g. | 21.01 | 0.33 |
| Allylglycidyl ether | 114.14 g. | 78.21 | 1.0 |
| Concentrated Sulfuric acid | 1.14 g. | 0.78 | 0.011 |

Sulfuric acid is added to the mixture of glycerol and allylglycidyl ether at a maximum temperature of 30° C. The addition of sulfuric acid is exothermic. After the addition is completed, the temperature is raised to 105° C. and stirring continued at that temperature for five hours. The presence of epoxy group was monitored in the reaction mixture during the reaction time. When the level of allylglycidyl ether is under the detection limit, the reaction mixture is brought to room temperature and collected. B-brancher is an adduct of glycerol and allylglycidyl ether and has the following structure:

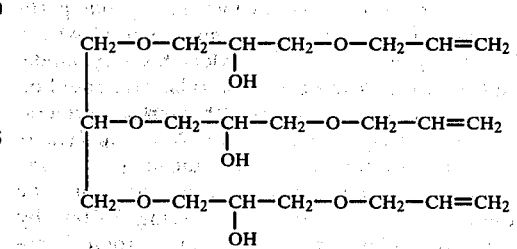

EXAMPLE V

The procedure was similar to that in Example II except that the weight ratio of acrylamide to acrylic acid in the copolymer was 60:30 and the multi-functional unsaturated monomer was polyoxyethylene-600 dimethylacrylate which was used in the quantity of 10% by weight, based on total monomers.

This product also gave excellent dust control properties.

It should be noted that the concentration of brancher can have a very definite effect on the effectiveness of the final product for dust control. Thus, too little or too much brancher may be the difference between a product with very good activity and a product with very poor activity. The relative proportions of acrylamide and sodium acrylate in making the copolymer can also have an effect. In general with acrylamide-acrylic acid copolymers there should be a major proportion of acrylamide and with acrylamide methylene-bis-acrylamide polymers the quantity of methylene-bis-acrylamide based on the weight of the monomers is preferably about 60 parts per million.

In screening tests of the type previously described using a dosage of 0.026 pound per square yard of the composition illustrated in Example I, a rating of 76.4 was obtained indicating a satisfactory control of dustiness. This composition was made by using 60 ppm, based on the monomers, of methylene-bis-acrylamide. A composition made by using 133 ppm of methylene-bis-acrylamide, all other conditions being the same, gave a rating of 18.7 and was therefore unsatisfactory.

A composition made from 70% acrylamide, 28% sodium acrylate, 2% 2-hydroxyethyl methacrylate and 1% A-brancher (based on total monomers) when tested according to the screening procedure previously described at a dosage of 0.25 pound per square yard, gave a rating of 80. On the other hand, a composition made with 8% acrylamide, 90% sodium acrylate, 2% 2-hydroxyethyl methacrylate and 1% A-brancher (based on total monomers), all other conditions being the same, at a dosage of 0.038 pound per square yard, gave a rating of only 33.1.

A composition made with 70% acrylamide, 30% sodium acrylate with 2.5% B-brancher (based on total monomers) at a dosage of 0.100 pound per square yard when screened according to the procedure previously described, gave a rating of 92.7. When the amount of B-brancher was reduced to 1.5%, all other conditions being the same, the rating was 58.7. When the amount of B-brancher was reduced to 0.5%, all other conditions being the same, the rating was 23.8.

From the foregoing results it is apparent that the quantity and type of monomer or comonomer and cross-linking multifunctional unsaturated monomer must be empirically determined so that the resultant crss-linked polymer or copolymer will be highly branched and be in the form of microgelatinous particles. If a monomer such as acrylamide is used with a cross-linking agent such as methylene-bis-acrylamide, the quantity of the methylene-bis-acrylamide, based on the monomer, should be less than 100 ppm and preferably should not exceed about 60 ppm. With copolymers of acrylamide and acrylic acid the quantity of cross-linking agents does not appear to be as critical and the best results have been obtained by using 1–10% by weight of cross-linking agent, based on the total monomers, the amount varying within this range depending upon the specific cross-linking agent or combination of cross-linking agents.

One of the advantages of the present invention is that the oil-in-water emulsions containing the water swellable polymers in the aqueous phase, when applied to dusty surfaces, do not form water impervious coatings. Hence, rain water, for example, can still penetrate these surfaces to the ground or other underlying formation and be absorbed whereas conventional oil coated surfaces or surfaces that are coated with an impervious crust do not permit absorption or penetration but tend to cause the water to run off and, in some cases, product flooding. These oily or otherwise impermeable crusts which characterize the most common methods of allaying dust, therefore, prevent water such as rain water from penetrating the ground or underlying soil, thereby creating an arid condition. Accordingly, the present invention provides a system for allaying dust on roads or other surfaces without destroying build-up of the ground water level.

EXAMPLE VI

A dust inhibiting composition was prepared in the form of a highly branched water-swellable polymer of acrylamide and methylene-bis-acrylamide dispersed as a water-in-oil emulsion, the reaction product consisting of the following ingredients:

0.013% ethylene diamine tetraacetic acid (tetrasodium salt)
0.295% boric anhydride
1.6% of a nonylphenol 9 mole ethoxylate
0.98% Alkaterge-T, a substituted oxazaline
24.43% LOPS (mineral oil)
28.44% acrylamide
0.0018% methylene-bis-acrylamide
Remainder being water After free radical catalysis of the above mixture, the branched polymer contained within the mixture was made up of 98.37% acrylamide and 1.63% methylene-bis-acrylamide.

The water-in-oil latex formulation was inverted into water to form solutions containing 1.5%, 2.05%, and 2.69% of the above formulation. These aqueous solutions were then sprayed onto the surfaces of crushed coal contained within coal cars attached to a commercial railroad train. These coal cars were sprayed prior to a transcontinental trip. Comparisons were made to oil-in-water rubber latices which were previously used to minimize dusting during this transcontinental trip. These rubber latices could be either styrene-butadiene resin emulsions (oil-in-water) or vinyl acetate-acrylics copolymers in oil-in-water latex form.

Comparisons were made between the commercial oil-in-water rubber latices and the aqueous solutions containing the water swellable dust binder of this invention. The water-swellable dust binder of the present invention was effective in controlling dusting at a dosage from 37.5% to 67.25% of the dosage rates of the commercial rubber latex binder.

Clearly, this comparative test shows the efficacy of using the highly branched water-swellable acrylamide polymers of this invention as anti-dusting and binding agents to protect against loss of coal and other minerals during cross-country transit in open railroad cars or trucks.

The invention is hereby claimed as follows:

1. A method of controlling dust on roads, in mines, on mineral and/or tailings piles or impoundments, controlling dust and wind erosion from surfaces of pulverized coal and mineral piles contained within open transit cars such as coal cars or trucks, and on other surfaces containing coal particles, rock dust, clay, soil particles and other finely divided particles subject to dusting, which comprises applying thereto a dust inhibiting amount of a liquid dispersion of watery consistency of a highly branched water swellable polymer of acrylamide or an acrylamide-acrylic acid copolymer, cross-linked with a multifunctional unsaturated monomer containing more than one ethylenically unsaturated group, said cross-linked polymer or copolymer having a three-dimensional structure and being in the form of microgelatinous particles, having an average particle size not exceeding approximately one micron in an oil continuous emulsion form, and having the property of allaying such dust.

2. A method as claimed in claim 1 in which the highly branched water swellable polymer is a polymer of acrylamide and methylene-bis-acrylamide.

3. A method as claimed in claim 1 in which the highly branched water swellable polymer is an acrylamide-acrylic acid copolymer having a major proportion of acrylamide, cross-linked with the reaction product of allylamine and a copolymer of maleic anhydride and methyl vinyl ether having the chemical structure

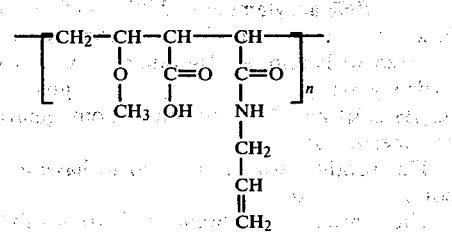

4. A method as claimed in claim 1 in which the highly branched water swellable polymer is an acrylamide-acrylic acid copolymer having a major proportion of acrylamide, cross-linked with 2-hydroxy ethyl methacrylate and the reaction product of allylamine and a copolymer of maleic anhydride and methyl vinyl ether having the chemical structure

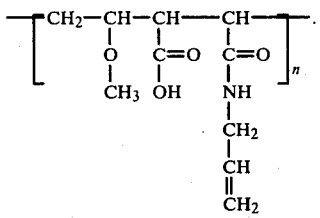

5. A method as claimed in claim 1 in which the highly branched water swellable polymer is an acrylamide-acrylic acid copolymer having a major proportion of acrylamide, cross-linked with tris-(2-hydroxy-3-allyloxy)propoxy glycerol ether.

6. A method as claimed in claim 1 in which said liquid dispersion is applied to surfaces of pulverized coal and mineral piles contained within open transit cars or trucks.

7. A method as claimed in claim 1 in which said liquid dispersion is applied to surfaces of pulverized coal and mineral piles contained within open transit cars or trucks and said highly branched water-swellable polymer is a polymer of acrylamide and methylene-bis-acrylamide.

8. A method as claimed in claim 1 in which said liquid dispersion is applied to surfaces of pulverized coal and mineral piles contained within open transit cars or trucks and said highly branched water-swellable polymer is an acrylamide-acrylic acid copolymer having a major proportion of acrylamide, cross-linked with the reaction product of allylamine and a copolymer of maleic anhydride and methyl vinyl ether having the chemical structure

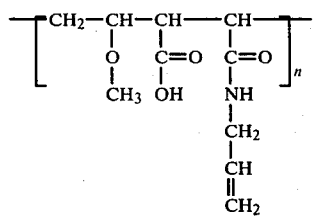

9. A method as claimed in claim 1 in which said liquid disperson is applied to surfaces of pulverized coal and mineral piles contained within open transit cars or trucks and said highly branched water-swellable polymer is an acrylamide-acrylic acid copolymer having a major proportion of acrylamide, cross-linked with 2-hydroxy ethyl methacrylate and the reaction product of allylamine and a copolymer of maleic anhydride and methyl vinyl ether having the chemical structure

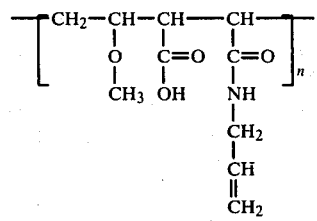

10. A dust control composition comprising a dust inhibiting amount of a liquid dispersion of watery consistency of a highly branched water swellable polymer of acrylamide or an acrylamide-acrylic acid copolymer, cross-linked with a multifunctional unsaturated monomer containing more than one ethylenically unsaturated group, said cross-linked polymer or copolymer having a three-dimensional structure and being in the form of microgelatinous particles having an average particle size not exceeding approximately one micron in an oil continuous emulsion form and having the property of allaying dust.

11. A dust control composition as claimed in claim 10 in which the highly branched water swellable polymer is a polymer of acrylamide and methylene-bis-acrylamide.

12. A dust control composition as claimed in claim 10 in which the highly branched water swellable polymer is an acrylamide-acrylic acid copolymer having a major proportion of acrylamide, cross-linked with the reaction product of allylamine and a copolymer of maleic anhydride and methyl vinyl ether having the chemical structure

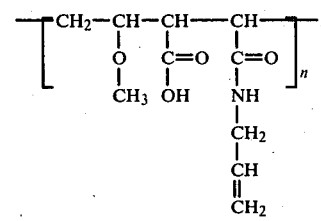

13. A dust control composition as claimed in claim 10 in which the highly branched water swellable polymer is an acrylamide-acrylic acid copolymer having a major proportion of acrylamide, cross-linked with 2-hydroxy ethyl methacrylate and the reaction product of allylamine and a copolymer of maleic anhydride and methyl vinyl ether having the chemical structure 14. A dust control composition as claimed in claim 10 in which the highly branched water swellable polymer is an acrylamide-acrylic acid copolymer having a major proportion of acrylamide, cross-linked with tris-(2-hydroxy-3-allyloxy)propoxy glycerol ether.

* * * * *

UNITED STATES PATENT AND TRADEMARK OFFICE
CERTIFICATE OF CORRECTION

PATENT NO. : 4,417,992

DATED : November 29, 1983

INVENTOR(S) : BHUPATI R. BHATTACHARYYA and WILLIAM J. ROE

It is certified that error appears in the above-identified patent and that said Letters Patent is hereby corrected as shown below:

Under "References Cited" [56], "OTHER PUBLICATIONS"--
"Chemical Abstract (a)" should read --Chemical Abstract (1)--.

In the ABSTRACT [57], line 12, "polyer" should read --polymer--.

Column 7, line 19, "crss-linked" should read --cross-linked--.

Signed and Sealed this

Fourteenth Day of February 1984

[SEAL]

Attest:

GERALD J. MOSSINGHOFF

Attesting Officer

Commissioner of Patents and Trademarks